Aug. 22, 1972  E. T. BROWN ET AL  3,686,061
METHOD FOR PRODUCING ELONGATED PLYWOOD PANELS
Filed Oct. 12, 1970
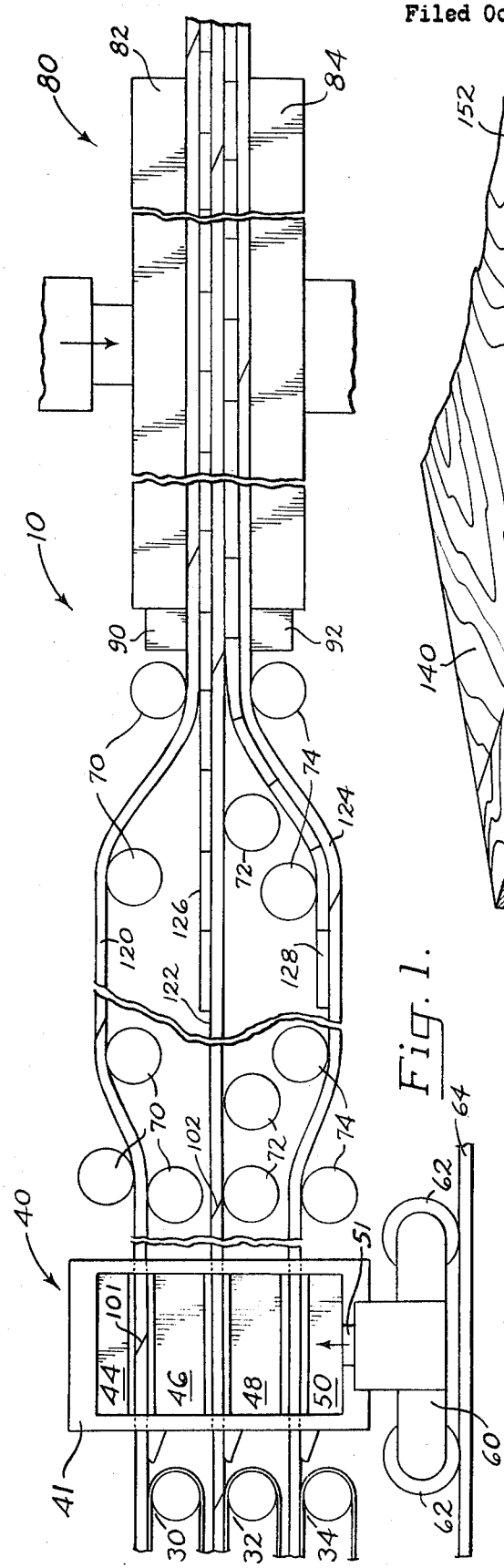
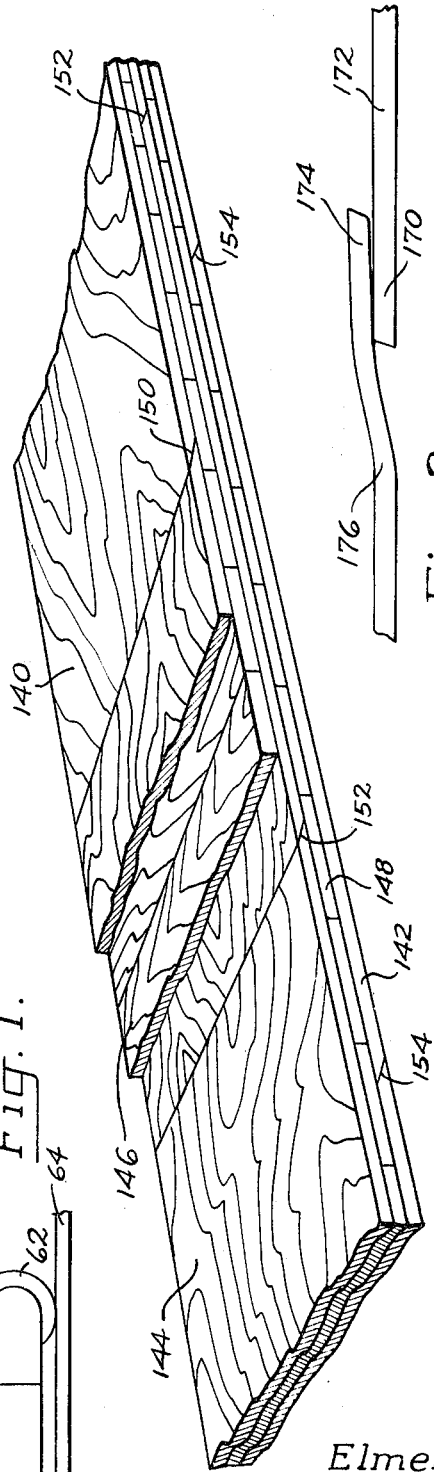
Elmer T. Brown
Jackson H. Carroll
INVENTORS
BY Kolisch & Hartwell
Attys.

3,686,061
METHOD FOR PRODUCING ELONGATED PLYWOOD PANELS
Elmer T. Brown, Astoria, and Jackson H. Carroll, Portland, Oreg., assignors to West Coast Adhesives Company, Portland, Oreg.
Filed Oct. 12, 1970, Ser. No. 79,800
Int. Cl. B27d 1/06; B32b 5/12, 21/14, 31/04, 31/16
U.S. Cl. 161—56    12 Claims

ABSTRACT OF THE DISCLOSURE

An elongated plywood panel and a method for producing the same. Elongated continuous face, back and intermediate veneer sheets are formed by joining multiple sheet sections end-to-end, such sheet sections having grain extending longitudinally of the veneer sheets formed. Contiguous ends of adjacent sheet sections in a veneer sheet are chamfered in reverse directions, and these are overlapped in the sheet. The ends are joined with thermosetting glue, which is set by applying heat and pressure thereto. The joints between sheet sections in a veneer sheet thus formed extend transversely of the veneer sheet. The continuous face, back and intermediate veneer sheets are moved longitudinally, in spaced face-to-face relation, along adjacent flow paths, with the joints between sheet sections in each veneer sheet spaced along the flow path from similar joints in other veneer sheets. Core sheets with thermosetting glue applied to their opposite faces are interposed between the veneer sheets. The veneer and core sheets then are heated and pressed together to set the glue. The paneling produced may then be cut to a desired length.

---

This invention relates to the production of an elongated plywood panel, and a method for producing the same.

Multiple-ply, cross-bonded plywood has usually been made in eight or ten foot lengths. Such panels are layed up with face, back, and intermediate veneer sheets having grain which extends lengthwise of the panel. Core sheets interspersed therebetween have grain which extends transversely of the panel. Panels generally have been limited to such lengths, since it is difficult to peel veneer from logs much greater than 10 or 12 feet in length. Further, press equipment cannot accommodate greater lengths in the usual batch-type operation.

Various methods have been proposed for forming longer panels by joining previously layed-up plywood panels in end-to-end relation. Such methods generally include scarfing adjacent ends of a pair of panels to form mating surfaces, and gluing the panels together along the scarfed surfaces. Panels produced by these methods have not proved satisfactory, especially when the panel is subjected to bending. In such a panel the glued joint extends through the full thickness of the panel formed. Thus, at the joint there is no veneer sheet with grain extending normal to the joint which is continuous across the joint between the panels. Thus, when tension is applied to the panel (bending tenses a face and center sheet) failure may occur at the joint.

A general object of this invention is to provide a novel method of making an improved elongated panel.

Another object of the invention is to provide a novel elongated plywood panel which overcomes the above-noted deficiencies.

More specifically, an object is to provide an elongated plywood panel which includes face, intermediate, and back veneer sheets having grain extending lengthwise of the panel, each of said veneer sheets being formed of multiple sheet sections joined edge-to-edge with adjacent edges overlapping and being glued together. The joints between sections in each veneer sheet are spaced lengthwise of the panel from similar joints in other veneer sheets. With the joints so spaced, there is no joint extending fully through the thickness of the panel which will separate easily on tension being applied.

Another object is to provide a novel method for laying-up such an elongated plywood panel, wherein multiple continuous veneer sheets are formed of joined sheet sections, these veneer sheets being in face-to-face, spaced-apart relation. Core pieces are interspersed with such sheets and the sheets and core pieces are then fed into a press. Consolidation in the press produces continuous paneling which may be cut into panels of desired length.

Following the invention, long panels of considerable width are also possible, with the width of a panel obtainable being up to the length of the press available.

These and other objects and advantages will become more fully apparent as the following description is read in conjunction with the drawings, wherein:

FIG. 1 is a simplified drawing illustrating apparatus for performing the method of the invention with portions of the apparatus broken away;

FIG. 2 is a perspective view of paneling produced by the method of the invention, with portions broken away; and FIGS. 3 and 4 illustrate a modified method for joining veneer sections in a veneer sheet.

Referring now to FIG. 1, at 10 is indicated generally apparatus which is operable to produce an elongated plywood panel according to the invention. The apparatus includes vertically spaced horizontal belt conveyors 30, 32, 34 which are operable to convey sheet material along spaced flow paths in a downstream direction through the apparatus, to the right in FIG. 1. The downstream ends only of the belt conveyors are shown in the drawing.

A traveling press 40 is positioned immediately downstream from the belt conveyors. Such comprises a press frame 41 mounting a series of platens. More specifically, such platens include a top platen 44 stationarily mounted within the frame, a pair of vertically shiftable center platens 46, 48, and a vertically shiftable power-actuated bottom platen 50. The platens may all be heated for use with hot press glues. Conventional powered means including a piston 51 is connected to platen 50 which is operable when actuated to force platen and the other movable platens upwardly.

Such movement of the platens results in the application of heat and pressure to any veneer lodged between platens 44 and 46, and any veneer similarly lodged between platens 46, 48 and platens 48, 50. The regions between platens 44, 46, platens 46, 48, and platens 48, 50, where such veneers are pressed, constitute joining stations in the press.

Press 40 is mounted on a carriage assembly 60. The carriage assembly has wheels 62 which are movable along rails such as that shown at 64. Drive mechanism (not shown) connected to the carriage is operable to move the carriage and press along the rails, to the right or to the left in FIG. 1, as required during manufacture of the paneling.

Rollers 70, 72, and 74 make up vertically spaced roller conveyors positioned downstream from press 40. The roller conveyors are operable to carry venner in a downstream direction along adjacent vertically spaced flow paths.

A panel press 80 is disposed at a press station downstream from the roller conveyors. The panel press comprises a pair of opposed platens 82, 84 which may be heated. The platens are operatively connected to conventional means for forcing the platens together during a press cycle.

Cooling means 90, 92 are mounted on the upstream ends of platens 82, 84, respectively. The cooling means are refrigerated by conventional means and are insulated from the platens.

The apparatus just described is designed for the manufacture of five-ply panels, although it should be obvious that the apparatus could be easily modified for the manufacture of panels having a different number of plys. Conveyor 30, the joining station between platens 44, 46 and roller conveyor 70 provide one flow path for veneer through the apparatus prior to such being fed into the press 80. Conveyor 32 the joining station between platens 46, 48 and roller conveyor 72 provide another flow path for veneer forming another ply in the panel produced. Conveyor 34, the joining station between platens 48, 50 and roller conveyor 74 provide yet another flow path for veneer forming a third ply in the paneling produced.

According to the method of the invention, a continuous veneer sheet is prepared in each of such flow paths and is conveyed to the press 80. Such is done, and considering the upper of the flow paths illustrated in FIG. 1, by feeding or conveying a series of veneer sheet sections, one after another, into the joining station which is provided in the flow path, with joining of adjacent edges of such veneer sheet sections occurring in such joining stations. More specifically, each veneer sheet section, which has grain extending along its length, is carried by the conveyor with movement extending generally in the direction of the grain of the sheet section. The ends of the sheet sections are chamfered, i.e., beveled edges are provided along these ends. The ends of adjacent sheet sections are chamfered in reverse directions to provide mating overlapping surfaces, such are overlapped and a glue deposit is provided therebetween on such reaching the joining station of the flow path.

The overlapped ends between two adjacent sheet sections are united in the joining station by applying heat and pressure utilizing the opposed platens which define the station. The traveling mounting for the press described permits the press to travel with the veneer material while maintaining compressive pressure against the overlapping ends for a greater time. In this manner, the material leaving press 40 comprises a continuous veneer sheet, or strip.

An important concept of the invention is that the joint formed between adjacent ends of the sheet sections in one line, for instance the top line in FIG. 1, such joint being shown at 101, is prepared so as to be spaced lengthwise along the veneer strip produced, or in the direction of travel of the strip, from similar joints between veneer sheet sections joined in the other flow paths. This relationship is illustrated by joint 102 in FIG. 1 where veneer sheet sections in material processed in the flow path which includes roller conveyor 72 are joined.

Shown at 120, 122 and 124 are the continuous veneer sheets or strips produced by travel of material through the various joining stations. Between press 40 and press 80, sheets 120 and 124 are caused to be diverted away from the intermediate sheet 122 to accommodate the placement of core sheets 126, 128 between the various sheets. The various sheets then converge on each other prior to entering press 80.

Core sheets in edge-abutting relation are placed between continuous veneer sheets 120, 122 and between veneer sheets 122, 124 upstream of press 80. The grain of these core sheets extends across the grain of the continuous veneer sheets. The adhesive, or glue, which unite the various plies in the completed paneling may be introduced by spreading such adhesive on opposite faces of the core sheets prior to their placement in the assembly.

The assembly, comprising the continuous veneer sheets with interspersed core sheets forming alternate layers with the continuous veneer sheets, is consolidated into an integrated product upon such being compressed and heated by press 80. The press shown is a batch-type press and consolidation occurs step-by-step, in that part of the assembly only at any given time is subjected to a given press cycle.

Cooling means 90, 92 are included to inhibit premature setting of the adhesive, or glue, uniting the plies in the assembly in a region of the assembly not subjected directly to the pressure developed in the press.

The continuous paneling which travels in a stepwise manner downstream from press 80 may be cut into panels of any desired length, which length considerably exceeds the length of the sheet sections used to form the veneer strips 120, 122, 124. In the five-ply panel produced in the embodiment of the invention illustrated, face and back plies result from segments cut from continuous veneer strips 120, 124 and a center or intermediate ply results from the cutting of strip 122. In FIG. 2 the face, back, and center are shown at 140, 142, and 144, respectively, with interspersed core sheet layers at 146 and 148.

It should be noted with reference to FIG. 2, by reason of the placement of joints appearing in the face, back and center veneer sheets indicated at 150, 152, 154, there is absent in the panel a formed joint which extends continuously through the thickness of the panel. This, together with the use of chamfered edges as discussed introduces into the panel maximum resistance to failure from tensing.

FIGS. 3 and 4 illustrate a modified manner of forming a joint between adjacent sheet sections. Chamfered edges are shown in these veneer sheet sections but such are not placed with one directly against another. Instead, a marginal portion 170 of sheet section 172 is overlapped by the marginal portion 174 of sheet section 176. When such is subjected to pressure, as in press 40 during joining of the adjacent edges, the overlapping margins are compressed to essentially the thickness of the sheet sections, as shown in FIG. 4.

While an embodiment of the invention has been described, it should be apparent to those skilled in the art that changes and modifications may be made without departing from the spirit of the invention.

It is claimed and desired to secure by Letters Patent:

1. A process for producing an elongated plywood panel comprising forming an assembly comprising continuous face and back veneer sheets where such sheets extend in a common direction and are in a face-to-face and spaced-apart relationship, each sheet being formed from multiple sheet sections in end-to-end relationship and with the grain thereof extending in said common direction and with bonded joints between adjacent sheet sections extending transversely of said common direction, the joints between adjacent sheets sections in each veneer sheet being spaced lengthwise of the veneer sheet from similar joints in the other veneer sheets, interspersing core sheets in abutting edge-to-edge relation between said continuous veneer sheets of such assembly with the grain in said core sheets extending transversely of the grain in the veneer sheets, and feeding said assembly with interspersed core sheets into a press for consolidation of the assembly.

2. The process of claim 1, which further comprises chamfering contiguous ends of adjacent sheet sections in reverse directions to provide mating overlapping surfaces for the sheet sections.

3. The process of claim 2, wherein said chamfered mating surfaces are bonded by applying a thermosetting glue therebetween and pressing said ends together while applying heat thereto.

4. The process of claim 1, wherein said core sheets and veneer sheets are glued together by introducing thermosetting glue therebetween prior to introduction of the assembly to the press.

5. A process for producing elongated plywood panels comprising conveying a first series of elongated sheet sections successively in one direction along a first flow path with the grain in the sheet sections extending lengthwise of the flow path, conveying a second series of elongated sheet sections successively in said direction along a second flow path with the grain in the sheet sections extending lengthwise of the flow path, conveying a third series of elongated sheet sections successively in said one direction along a third flow path with the grain in the sheet sections extending lengthwise of the flow path, at joining stations along said flow paths bonding adjacent ends of the sheet sections together to form elongated face, intermediate, and back veneer sheets with the joints between adjacent sheet sections in each veneer sheet extending transversely of the sheet formed, moving said face, back and intermediate veneer sheets thus formed longitudinally in said one direction along said flow paths in spaced face-to-face relationship, with the face and back veneer sheets on opposite sides of said intermediate veneer sheets, and with the joints between adjacent sheet sections in each veneer sheet spaced along the flow paths from similar joints in the other veneer sheets, interspersing core sheets in edge-abutting relationship between the veneer sheets with the grain in the core sheets extending transversely of the grain in the veneer sheet, and consolidating said veneer sheets and core sheets together.

6. The process of claim 5, wherein said veneer and core sheets are consolidated by introducing thermosetting glue therebetween, and by moving the veneer and core sheets into a press station where pressure is applied.

7. The process of claim 6, wherein said process further comprises cooling said veneer sheets and core sheets at a cooling station on the upstream side of said press station to inhibit setting of glue between the core and veneer sheets prior to such entering the press station.

8. The process of claim 5, wherein glue is introduced by applying such to opposite faces of each core sheet prior to interspersing a core sheet between the veneer sheets.

9. The process of claim 5, which further comprises chamfering contiguous ends of adjacent sheet sections in a veneer sheet in reverse directions to provide mating overlapping surfaces where said adjacent sheet sections are joined.

10. A plywood panel comprising spaced face and back veneer sheets and at least one intermediate veneer sheet therebetween, said veneer sheets being disposed in the panel with their grain extending in a common direction, and multiple core sheets in edge-abutting relationship forming layers alternating with said veneer sheets, and the grain in said core sheets extending transversely of said common direction, each of said veneer sheets comprising a plurality of sheet sections joined with an edge of one sheet section overlapping an edge of an adjacent sheet section, said overlapping edges being glued together to form a joint extending transversely of said common direction, said face, intermediate and back veneer sheets being disposed in said panel with each joint in each veneer sheet spaced in said common direction from similar joints in other veneer sheets.

11. The panel of claim 10, wherein said overlapping edges of said sheet sections comprise abutting mating chamfers.

12. The panel of claim 10, wherein adjacent sheet sections in a veneer sheet have margins next to their said overlapping edges which also overlap, and a joint between adjacent sheet sections is formed with said overlapping margins compressed to essentially the thickness of a sheet section.

References Cited

UNITED STATES PATENTS

| | | | |
|---|---|---|---|
| 3,133,850 | 5/1964 | Alenius | 156—299 X |
| 2,302,962 | 11/1942 | Laucks et al. | 161—56 X |
| 2,323,105 | 6/1943 | Welch | 156—300 X |
| 2,578,781 | 12/1951 | Brundige | 161—56 X |
| 3,461,932 | 8/1969 | Shelton et al. | 156—159 X |

FOREIGN PATENTS

| | | | |
|---|---|---|---|
| 843,109 | 8/1960 | Great Britain | 156—288 |

WILLIAM A. POWELL, Primary Examiner

U.S. Cl. X.R.

144—317, 319; 156—157, 159, 258, 304, 324; 161—60